J. G. BUTLER.
Projectile.
No. 104,108.
2 Sheets—Sheet 1.
Patented June 14, 1870.
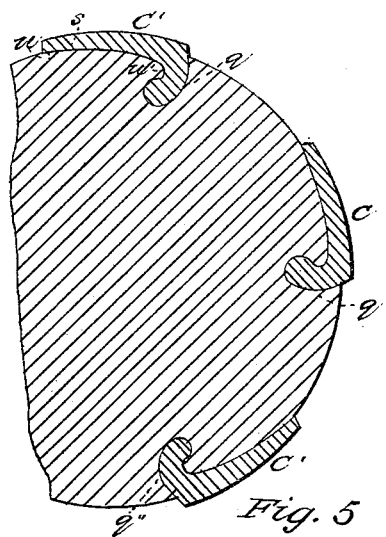
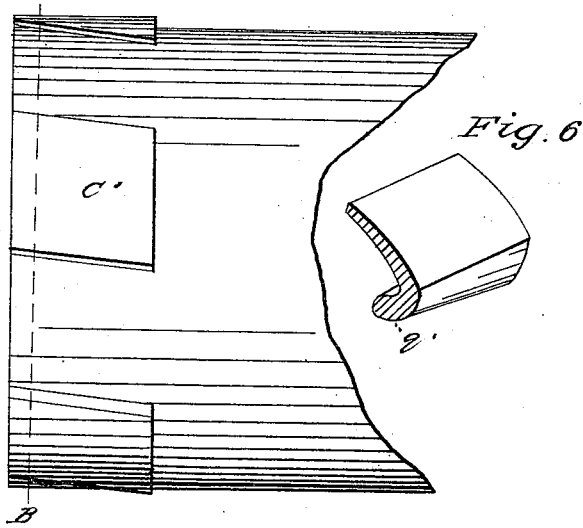
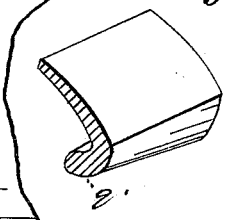
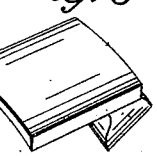
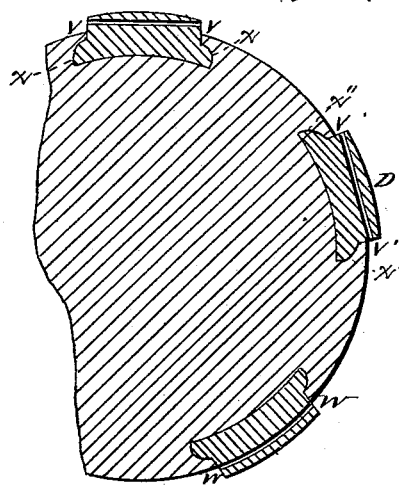
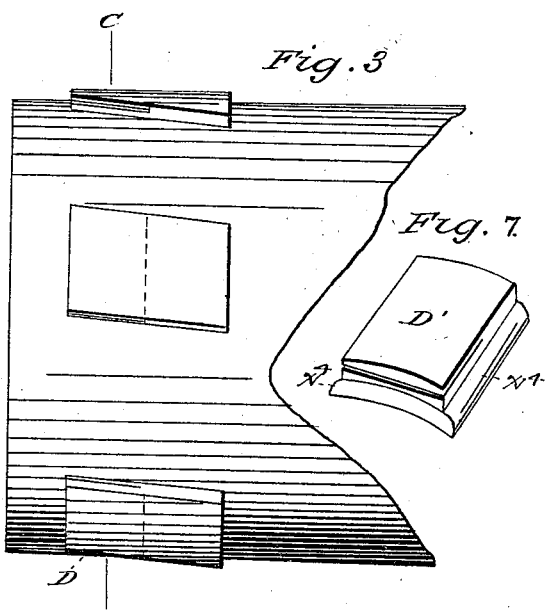
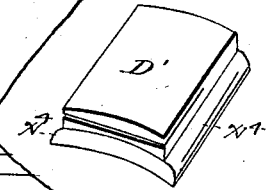
Witnesses:
E. T. Carr
Lewis Wagener
Inventor:
John G. Butler J. G. BUTLER.
Projectile.
No. 104,108.
2 Sheets—Sheet 2.
Patented June 14, 1870.
Fig. 1
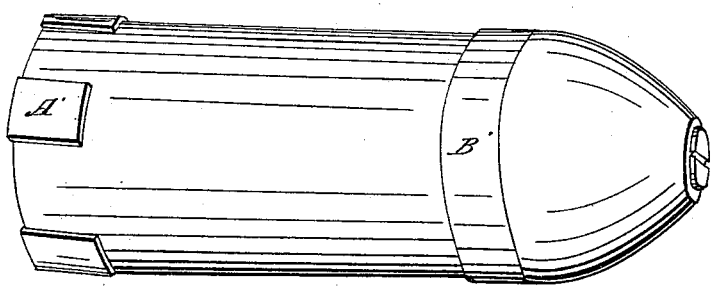
Fig. 2
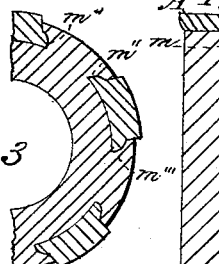 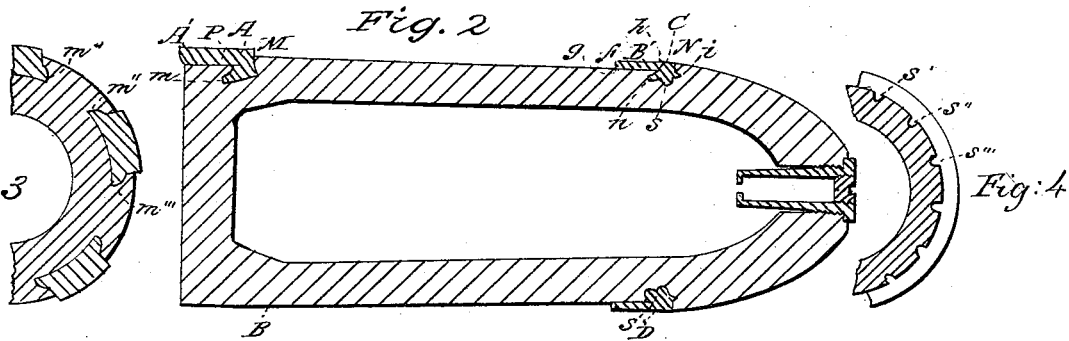 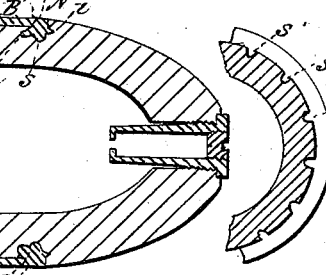
Fig. 3
Fig. 4
Fig. 6
Fig. 5
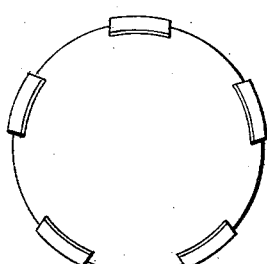 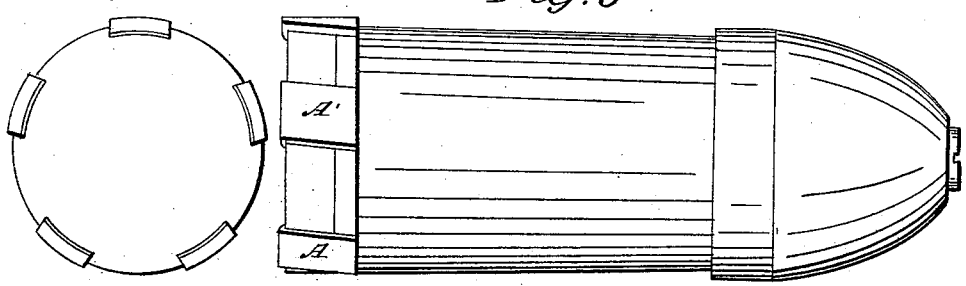
Fig. 7
Fig. 8  Fig. 9
Fig. 10
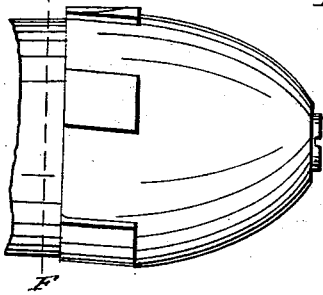 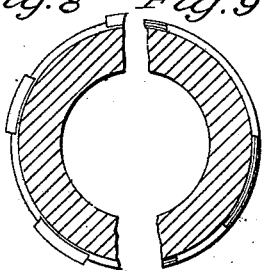 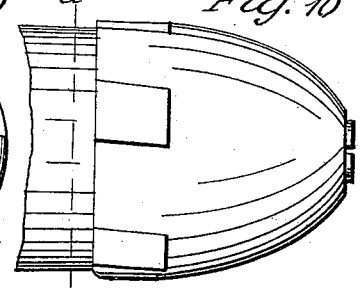
Witnesses:
E. T. Carr
W. Sooy Smith
Inventor:
John G. Butler
Lind & Ford

United States Patent Office.

JOHN G. BUTLER, OF FORT LEAVENWORTH, KANSAS.

Letters Patent No. 104,108, dated June 14, 1870.

IMPROVEMENT IN PROJECTILES FOR ORDNANCE.

The Schedule referred to in these Letters Patent and making part of the same.

*To all whom it may concern:*

Be it known that I, JOHN G. BUTLER, Ordnance Department, United States Army, of Fort Leavenworth, in the county of Leavenworth and State of Kansas, have invented a new and improved Projectile for Rifled Cannon; and I do hereby declare that the following is a full, clear, and exact description of the same, reference being had to the annexed drawings making a part of this specification, in which—

Figure I is a perspective.

Figure II is a longitudinal section.

Figure III is a cross-section through A–B of above.

Figure IV is a cross-section through C–D.

Figure V is a side-elevation, studs secured by connecting-band.

Figure VI is an end view.

Figure VII is an elevation, studs replacing front band.

Figure VIII is a cross-section through E–F of preceding.

Figure IX is a cross-section through G–H of Fig. X.

Figure X is an elevation, studs replacing front band, and flush.

The above figures are found on Sheet I of drawings.

On Sheet II of the same—

Figure I is an elevation of a part of a projectile.

Figure II is a cross-section through A B of Fig. I.

Figure III is an elevation of a part of another projectile.

Figure IV is a cross-section through C D of the same.

Figure V is a perspective view of an expanding stud.

Figure VI is a perspective view of the stud applied as shown in Fig. I, Sheet II.

Figure VII is a perspective of the stud shown applied in Fig. III, Sheet II.

My invention consists in an improvement in lifting-studs applied to projectiles for the purpose of centering the same; and The invention consists in the combination with a projectile of a band and studs, both expansible, and respectively fitted in under-cut cavities at the front and rear ends of a projectile.

The invention also consists in the construction of stud as shown in Figs. III, IV, and VII, of Sheet II.

In carrying out my invention, the body of the projectile may be first cast with under-cut cavities $m$ $m'$ $m''$ $m'''$, Figs. II and III, Sheet I, and the base of the projectile then clasped by a counter-mold, and said cavities filled with any suitable metal or alloy of metals, to form the studs, or, if preferred, studs of any suitable metal, coated with a preparation of black lead to prevent possible fusion, may be employed in place of the ordinary sand cores.

A' indicates one form of lifting-studs applied to the rear end of the projectile, having their bases P fitted in the transverse under-cut cavities $m$.

B' is a band inclosing the front of the projectile, its base projection $n$ $h$ $i$ fitting in an annular groove of corresponding form.

The studs are made low, to allow the projectile to be loaded with facility, and are designed to correspond in number to the grooves in the bore of the gun.

The first effect of the discharge is to lift the studs into their respective grooves, which contact remains perfect until the projectile leaves the gun, thereby centering the former and insuring its successful flight.

The powder gases also escape freely between the studs, and lift the band B', which, to some extent, takes the groove, whereby the full force of the gas is utilized to the end of accelerating of the flight of the projectile.

If studs be used in place of the band, the projectile may be centered equally well, but it is manifest that the powder-gases may escape to some extent between the studs, and thus their full effect be lost.

In Figs. I, II, IV, and VI, of Sheet II, the studs C' are represented as provided with base projections, differing slightly in form from those of the studs A' of Sheet I.

The said studs C' are inserted in cavities in the base of the projection, with their bases $q$ $q'$ $q''$ in a line slightly inclined or oblique to the axial line of the projectile, their expansible or free parts hugging closely to the projectile, as shown at $u$ $u$, Fig. II. The discharge lifts these studs, as in case of the former.

Figs. III, IV, VII, of Sheet II, represent studs, which are split part way through from the rear, and secured in cavities in the projectile by means of side projections $x$ $x'$ $x''$ $x'''$ $x^4$.

When the gas expands the split portion of each stud, the same effect is produced as in the cases above described.

The split or groove in the studs may be straight, as at $v$ $v$, or curved, as at $v'$ $v'$, to correspond with the curve of the projectile.

This stud may also be arranged parallel or inclined to the longer axis of the projectile.

Having thus described my invention,

What I claim as new, and desire to protect by Letters Patent, is—

1. The lifting-studs A', having projections fitting in under-cut cavities in the rear end of the projectile, and the band B', with projections $u$ $s$ $h$ $i$ fitting in corresponding annular groove at the front thereof, substantially as shown and described, and for the purpose described.

2. The split studs D, substantially as shown and described.

JOHN G. BUTLER.

Witnesses:
E. T. CARR,
J. M. NUTT,
WM. SOOY SMITH.